United States Patent
Colclough et al.

(10) Patent No.: US 11,131,617 B2
(45) Date of Patent: Sep. 28, 2021

(54) FLOW CELL FOR ANALYSIS OF FLUIDS

(71) Applicant: OLYMPUS AMERICA INC., Center Valley, PA (US)

(72) Inventors: Gerard Colclough, Quincy, MA (US); Steven W. Chin, Lexington, MA (US); Ronald Scott Collicutt, Northbridge, MA (US); Alex Thurston, Belmont, MA (US); Michael Murray, Boston, MA (US); Ernest Moseley, Wilmington, MA (US); Jacob LaRocca, Somerville, MA (US); Joel W. Kenyon, Londonberry, NH (US)

(73) Assignee: Olympus America Inc., Center Valley, PA (US)

( * ) Notice: Subject to any disclaimer, the term of this patent is extended or adjusted under 35 U.S.C. 154(b) by 0 days.

(21) Appl. No.: 16/934,429

(22) Filed: Jul. 21, 2020

(65) Prior Publication Data

US 2020/0348221 A1 Nov. 5, 2020

Related U.S. Application Data

(63) Continuation of application No. 16/118,005, filed on Aug. 30, 2018, now Pat. No. 10,753,847.

(51) Int. Cl.
*G01N 1/10* (2006.01)
*G01N 15/14* (2006.01)
*G01N 23/223* (2006.01)

(52) U.S. Cl.
CPC ..... *G01N 15/1404* (2013.01); *G01N 15/1425* (2013.01); *G01N 23/223* (2013.01); *G01N 2223/076* (2013.01)

(58) Field of Classification Search
CPC ........... G01N 15/1404; G01N 15/1425; G01N 23/223; G01N 2223/076; G01N 2223/637
See application file for complete search history.

(56) References Cited

U.S. PATENT DOCUMENTS 3,246,146 A * 4/1966 Cohen .............. G01N 23/20025
250/310
9,244,028 B2 1/2016 Camara
(Continued)

FOREIGN PATENT DOCUMENTS

DE 3111187 A1 9/1982

OTHER PUBLICATIONS

Shastry et al., "In-situ resolution dynamic X-ray microtomographic imaging of olive oil removal in kitchen sponges by squeezing and rinsing", Materials, MDPI, 15 pages. (Year: 2018).*
(Continued)

*Primary Examiner* — Kiho Kim
(74) *Attorney, Agent, or Firm* — Schwegman Lundberg & Woessner, P.A.

(57) ABSTRACT

A system for analyzing a fluid includes or uses a movable flow cell assembly being disposed in an analysis location on a wall of an analysis instrument and being configured to be retained by a locking assembly on a first surface of the wall. The system includes a probe head assembly located on an opposed second surface of the wall, the probe head assembly to direct an X-ray source to analyze the fluid in a static state in the movable flow cell assembly or in a flow mode through the movable flow cell assembly. The movable flow cell assembly and the probe head assembly are in electromagnetic communication for elemental analysis of the fluid using the X-ray source when the movable flow cell assembly is retained by the locking assembly on the first surface of the wall.

20 Claims, 17 Drawing Sheets

(56) References Cited

U.S. PATENT DOCUMENTS

| | | | |
|---|---|---|---|
| 2003/0128805 A1* | 7/2003 | Shepard | ............... G01N 23/223 378/47 |
| 2010/0124313 A1 | 5/2010 | Fujisawa | |
| 2010/0135868 A1 | 6/2010 | Ahn et al. | |
| 2011/0194671 A1 | 8/2011 | Chen et al. | |
| 2014/0262516 A1 | 9/2014 | Larson | |
| 2017/0171953 A1 | 6/2017 | Kikuchi et al. | |
| 2020/0072725 A1 | 3/2020 | Colclough et al. | |

OTHER PUBLICATIONS

"U.S. Appl. No. 16/118,005, Notice of Allowance dated Apr. 16, 2020", 9 pgs.

* cited by examiner

FLOW CELL FOR ANALYSIS OF FLUIDS

CLAIM OF PRIORITY

This patent application is a continuation and claims the benefit of priority of Colclough, et al., U.S. patent application Ser. No. 16/118,005, entitled "FLOW CELL FOR ANALYSIS OF FLUIDS," filed on Aug. 30, 2018, which is hereby incorporated by reference herein in its entirety.

TECHNICAL FIELD

The disclosed technology relates in general to elemental analysis of fluids, and more particularly, to a system for analyzing fluid having a flow cell optimized for X-Ray Fluorescence (XRF) analysis of fluid, such as liquid.

DESCRIPTION OF THE RELATED ART

Various devices are used in elemental analysis of fluid, such as liquids, by using XRF, in which an X-ray generator irradiates the liquid with X-rays and an X-ray detector detects characteristic X-rays emitted by the liquid components. Elemental analysis may also be performed using X-ray Diffraction (XRD), in which case incident X-rays are diffracted by solid crystalline components within the liquid. Problems with the current devices include poor reliability of the continuous operation of the devices that causes downtime, susceptibility to expensive repairs upon plumbing leak, and high maintenance effort and time are required to maintain the smooth operation of the devices.

Therefore, there is need for a system to analyze fluid such as liquid having a flow cell optimized for X-Ray Fluorescence (XRF) analysis of fluid and to overcome the aforementioned problems.

BRIEF SUMMARY OF EMBODIMENTS

Embodiments of the technology disclosed herein are directed toward a system for analyzing a fluid which comprises an integrated fluid-electric cabinet having a fluid compartment and an electronic compartment. The fluid compartment and an electronic compartment are separated from one another by a partition wall. The partition wall includes opposed first and second surfaces. A flow cell assembly is disposed in the fluid compartment and is configured to be mounted on the first surface side of the partition wall. A probe head assembly is disposed in the electronic compartment and is mounted on the opposed second surface side of the partitioned wall. Both of the flow cell assembly and the probe head assembly are configured to be in electro-magnetic communication with one another for elemental analysis of the fluid such that the probe head assembly utilizes an X-ray source to analyze the fluid in a static state or in flow mode through the flow cell assembly. The system further comprises a control circuit disposed in a control circuit cabinet and is coupled to both of the flow cell assembly and the probe head assembly to control a continuous operation of the fluid cell assembly and the probe head assembly.

According to various embodiments of the disclosed technology a system for analyzing a fluid comprises an integrated fluid-electric cabinet having a fluid compartment and an electronic compartment each of which being separated from one another by a partition wall. The partition wall includes opposed first and second surfaces having an opening formed therethrough. A flange chamber having an integral locking assembly is mounted on the partition wall via the opening. The integral locking assembly includes an engagement notch and a flange notch. A flow cell assembly is disposed in the flange chamber and is configured to be locked in by the engagement notch and a flange notch. A probe head assembly is disposed in the electronic compartment and is mounted on the opposed second surface of the partitioned wall. Both of the flow cell assembly and the probe head assembly are configured to be in electro-magnetic communication with one another for elemental analysis of the fluid such that the probe head assembly utilizes an X-ray source to analyze the fluid in a static state or in flow mode through the flow cell assembly.

Further embodiments of the technology disclosed herein are directed a flow cell assembly comprises a body having respective first and second ends spaced apart from one another. The first end include a fluid chamber formed therein and the second end includes a recess tray formed therein. The fluid chamber and the recess tray are in fluid communication via a plurality of flow paths that extend from the first end to the second end within the body. An X-ray primary window is configured to be attached to the first end of the body for encapsulating the fluid in the chamber and allowing an X-ray source to analyze the fluid in a static mode or in flow mode through the flow cell assembly. A cover flow cell seal having a cover central opening and a drain hole formed therein and is configured to be attached to the first end of the body with the X-ray primary window sandwiched therebetween. A window plate having a plate central opening formed therein and is configured to be attached to both of the X-ray primary window and cover flow cell seal. An X-ray secondary window is configured to be attached to the window plate enclosing the plate central opening and thereby forming an air gap with the drain hole located therebetween. The secondary window provides a safety back up to avoid fluid damage to various components in the event of a rupture or leak in the X-ray primary window. A window plate is configured to securely interconnect the body the X-ray primary window, the x-ray secondary window, and the cover flow cell seal to one another via various fasteners. The flow cell assembly further comprises a flow cell handle defined by a handle, a handle grip, a pair of standoff rods, and a spring arm all of which are interconnected to one another via fasteners. The flow cell handle is mounted onto the second end of the body. The recess tray includes a channel, respective inlet and outlet fluid ports, and a drain port all of which are formed within the recess tray. A backing plate is configured to be disposed and is in register within the recess tray. The X-ray primary window and the x-ray secondary window are made from material comprised of fluorinated ethylene propylene (FEP Teflon).

According to various embodiments of the technology a method of constructing a system for analyzing a fluid is disclosed. The method comprises the steps of fabricating an integrated fluid-electric cabinet having a fluid compartment and an electronic compartment each of which is separated from one another by a partition wall. The partition wall includes opposed first and second surfaces and an opening formed thereto. Next, forming a flange chamber having an integral locking assembly attached on the partition wall via the opening. The integral locking assembly includes an engagement notch and a flange notch. Next, mounting a flow cell assembly onto the flange chamber by rotating the flow cell assembly by a rotation angle in a first rotation direction and configured to be locked in by the engagement notch and a flange notch. And then, mounting a probe head assembly onto the electronic compartment by mounting on the opposed second surface of the partitioned wall. Finally, passing the fluid through the flow cell assembly, irradiating the fluid in the flow cell assembly using an X-ray generator, and detecting characteristic X-rays emitted from the fluid using an X-ray detector.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION OF THE EMBODIMENTS

Figure 1:
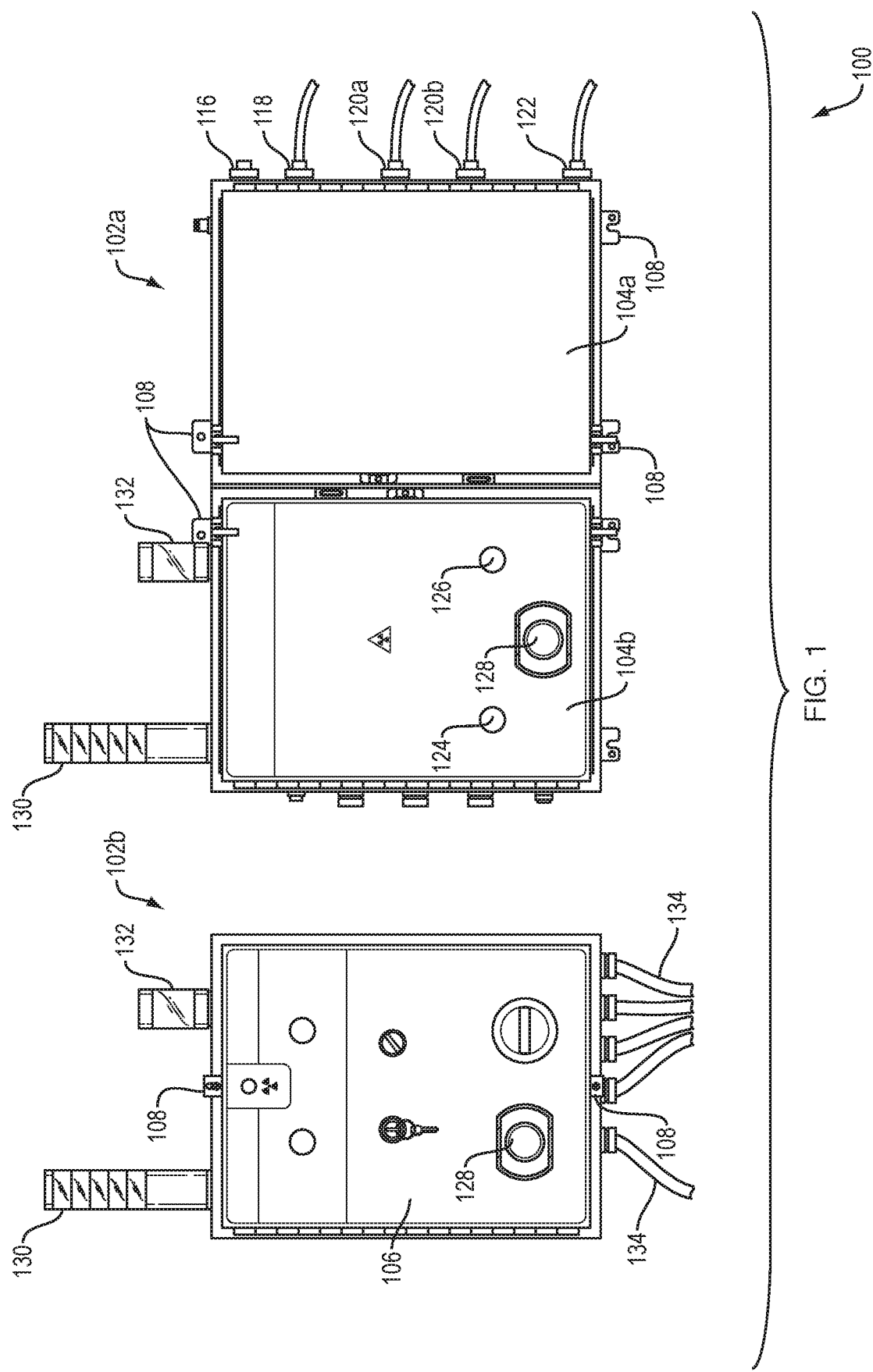
FIG. 1 is a front view of a system for analyzing a fluid enclosed in an integrated fluid-electric cabinet and a control circuit cabinet in accordance with one embodiment of the technology described herein.

In the following description, various embodiments of the technology will be described. For purposes of explanation, specific configurations and details are set forth in order to provide a thorough understanding of the embodiments. However, it will also be apparent to one skilled in the art that the technology disclosed herein may be practiced without the specific details. Furthermore, well-known features may be omitted or simplified in order not to obscure the embodiment being described.

Before describing the disclosed system and/or technology in detail, it is useful to describe an example application with which the technology can be implemented. One such example application is in the field of chemical, petrochemical, and/or refinery plants. The system that is used to analyze a fluid, such as liquid, provides a reliable and cost effective monitoring tool that is specially designed to accurately monitor chemical composition of process streams. The technology and/or the system disclosed herein uses X-ray fluorescence (XRF) to determine the types and amounts of elements that make up objects by irradiating them with small amounts of X-rays. This non-destructive technology provides a quick and accurate way to carry out elemental analyses of a variety of substances, including solids, powders and liquids. The system is used widely for a variety of purposes, including the detection of hazardous substances such as lead in electronic devices and construction materials, and assays of natural mineral resources, alloys and recyclable materials. By reliably monitoring process streams it provides a vital tool to improve product quality and consistency, optimize production yields, reduce raw materials, eliminates rejects and reduces time consuming and costly lab analysis. The system will reliably monitor many elements simultaneously from ppm to high % levels in most process fluids. No chemicals or auxiliary gases are required, assuring low operational costs. The system is constructed for continuous and automated operation in the harsh industrial environment of a chemical or other manufacturing plant.

The system can endure high levels of vibration, electromagnetic and acoustical noise. The system is constructed for un-attended operation for long periods of time. Special attention is paid in the design and construction of the flow cell assembly to make the system safe for both operators and equipment. In the unlikely event of a window leakage, a second safety window prohibits liquid from entering the electronic components and prevents any damage to the system. A leak detection system will instantaneously detect even the most miniscule leak; bypass the process stream, empty the flow cell and shut down the system. The system will simultaneously generate an alarm. Alarm inputs allow complete shutdown of the system in case of other emergencies. Some of features and function of the system are: 1) reliable continuous operation, 2) appropriate levels of Safety Certification allowing installation in process environments, 3) analysis window or the primary window must be able to last up to at least 4 weeks without leaks or analytical degradation before changing, 4) handle liquids with broad pH range such as, for example, at least 5 to 13, 5) quantitative analysis of Fe, Ni and Zn, 6) operating temperature range of at least 15° to 35° C., 7) allow the user to change the primary or measurement window quickly, easily, reliably (without concern about creating plumbing or leaking problems), and without using any tools for mounting and demounting the flow cell assembly.

Figure 2:
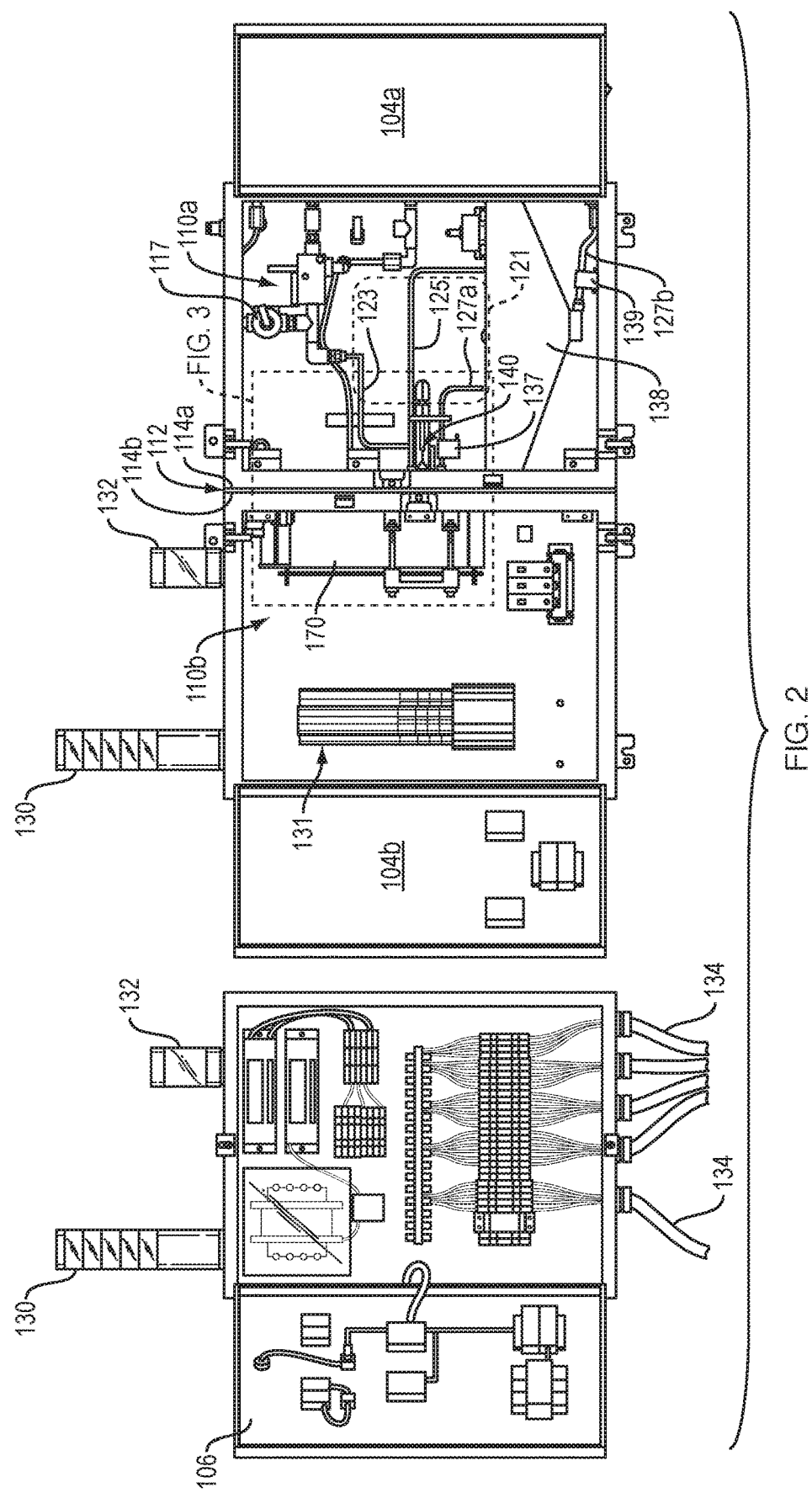
FIG. 2 is similar to FIG. 1 depicting the respective integrated fluid-electric cabinet and the control circuit cabinet having their respective front doors in an open position and illustrating a fluid compartment and an electronic compartment being separated from one another with a partition wall therebetween.

FIG. 1 is a front view of a system 100 for analyzing a fluid enclosed in an integrated fluid-electric cabinet 102a and a control circuit cabinet 102b with their respective front doors 104a, 104b, and 106 to be in a closed position using various locking knobs 108 and FIG. 2 is the same as FIG. 1 illustrating the respective front doors 104a, 104b, and 106 to be in an open position in accordance with one embodiment of the technology described herein. The integrated fluid-electric cabinet 102a and a control circuit cabinet 102b can be constructed from various sheet metals such stainless steel materials and the like. The integrated fluid-electric cabinet 102a includes a fluid compartment 110a and an electronic compartment 110b each of which is separated from one another by a partition wall 112. The partition wall 112 includes opposed first and second surfaces 114a, 114b. The fluid compartment 110a includes various ports 116, 118, 120a, 120b, and 122 connected to a liquid circuit 121 for fluid communication with a variety of industrial process plants to analyze a fluid, such as liquid and the likes. For example the vent port 116 provides external atmospheric pressure to the plumbing of the system 100. The respective cabinet inlet port 120a and cabinet outlet port 120b are connected to the liquid circuit 121 for passing the liquid in and out of the fluid compartment 110a. Similarly, respective by-pass cabinet outlet port 118 and cabinet drain port 122 is used to by-pass the liquid out and to drain the liquid from the fluid compartment 110a. The liquid circuit 121 is defined by a liquid inlet tube 123, a liquid outlet tube 125, a drain leakage tube 127a, and a pneumatic tube 129. There are various pneumatic switching valves such as pneumatic switching valve 117 and pressure sensors (not shown) that are used to control the liquid circuit 121 such that the liquid flows properly or in case of over pressuring or a leak, the valves would shut down since the fluid compartment 110a and the electronic compartment 102b are in electrical communication with one another. Liquid inlet tube 123 is equipped with an atmospheric inlet line and an atmospheric switching valve 117. The atmospheric liquid inlet tube 123 and atmospheric switching valve 117 allow the liquid system to operate with a static measurement mode, in which liquid is not flowing but resides statically within the fluid chamber 190 as seen best in FIG. 16. As an example of operation, a light button 124 is used to indicate that the liquid is flowing through the fluid compartment, a light button 126 is used to indicate that Radiation X-ray for liquid measurement is taking place in static mode or in flow mode, and a stop button 128 is used for an emergency shout-off. However, one of ordinary skill in the art would appreciate that those buttons 124, 126 may be used for other purposes depending on the user's requirements. Light towers 130 includes various lights indicative of various modes or faults or warnings such a leak, radiation, process and the like. Light towers 132 are used to indicate the X-ray radiation measurements is on. A plurality of electrical cables 134 is used to enable the integrated fluid-electric cabinet 102a and the control circuit cabinet 102b to be in electrical communication with one another. Similarly, a wiring block 131 is disposed therein and is controlled by a programmable logic controller or PLC (not shown) located outside of the system 100. It should be noted that it is within the scope of the present disclosure to integrate the control circuit 102b within the integrated fluid-electric cabinet 102a and to operate the entire system 100 wirelessly.

A flow cell assembly 140 is disposed in the fluid compartment 110a and is configured to be mounted on the first surface 114a side of the partition wall 112. A probe head assembly 170 is disposed in the electronic compartment 110b and is mounted on the opposed second surface 114b side of the partitioned wall 112. Both of the flow cell assembly 140 and the probe head assembly 170 are mounted to flange chamber 200 (FIG. 4) which span the partition wall 112 and is attached to partition wall 112 on both the surface 114a and the surface 114b. Both of the flow cell assembly 140 and the probe head assembly 170 are configured to be in electro-magnetic communication with one another for elemental analysis of the fluid such that the probe head assembly 170 utilizes an X-ray source to analyze the fluid in a static mode or in flow mode through the flow cell assembly 140 as will be described a greater detail hereinafter. The fluid compartment 110 further comprises a leakage tube 127a having a first end located at a lower end of the flow cell assembly 140 such that a fluid leakage portion of the fluid leaking into the flow cell assembly 140 enters the first end of the leakage tube 127a and exits a second end of the leakage tube 127a as will be described a greater detail hereinafter. The fluid leakage portion exiting the second end of the leakage tube 127a is directed to a leakage tray 138. The leakage tray 138 is drained by a leak drainage tube 127b. The leakage tube 127a is equipped with a first leak sensor 137 and is configured to detect fluid within the leakage tube 127a and the leak drainage tube 127b is equipped with a second leak sensor 139 and is configured to detect fluid within the leak drainage tube 127b.

Figure 3:
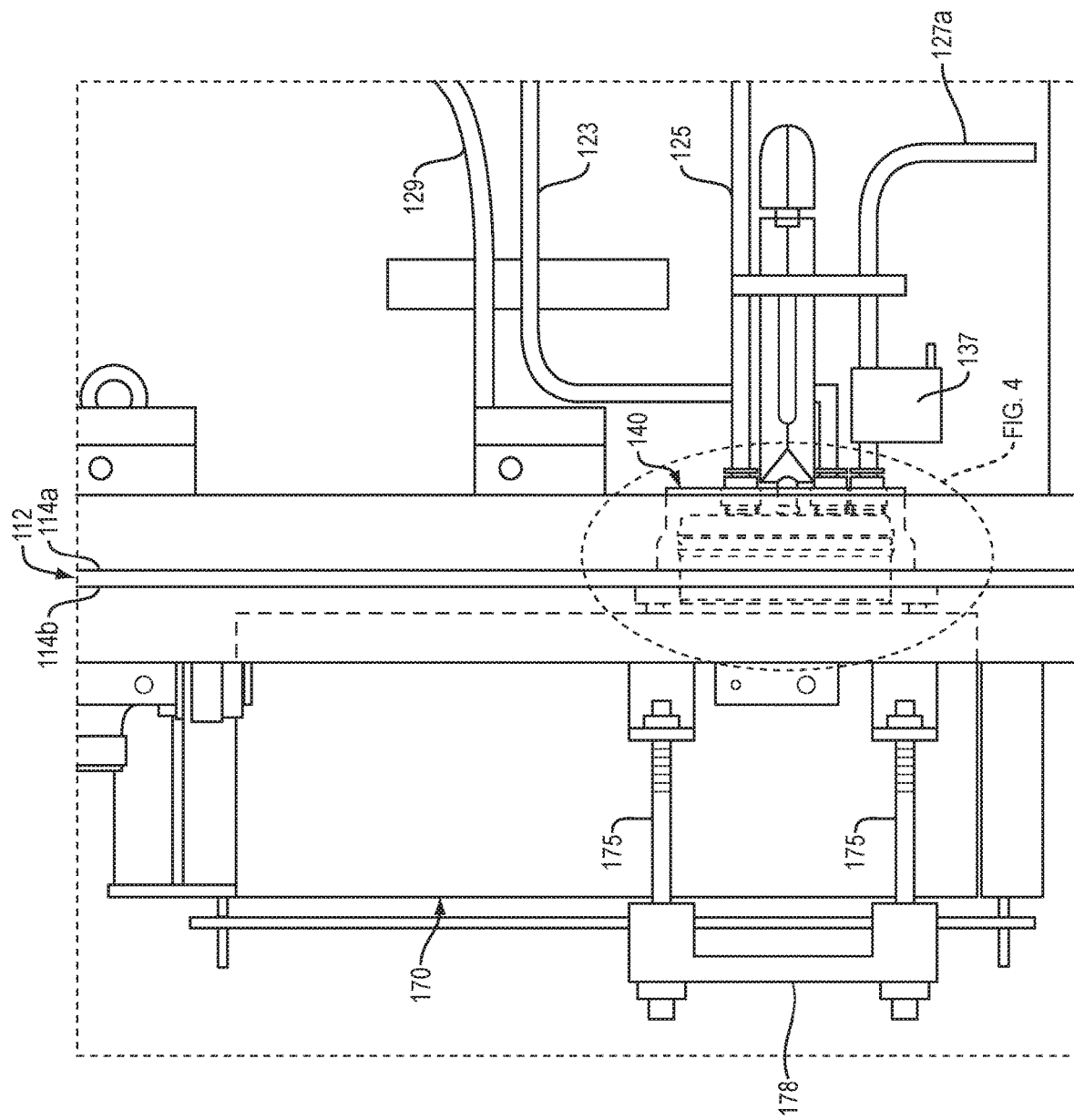
FIG. 3 depicts an enlarge side view of a portion of the integrated fluid-electric cabinet illustrating a flow cell assembly and a probe head assembly disposed in their respective positions.

FIG. 3 depicts an enlarged side view of a portion of the integrated fluid-electric cabinet 102a illustrating the flow cell assembly 140 and a probe head assembly 170 disposed in their respective positions. It should be noted that the partition wall 112 having the opposed surfaces 114a, 114b can alternatively be defined by two separate parallel walls 114a, 114b that are welded to one another. It should also be noted that proper positioning of the probe head assembly 170 with respect to the flow cell assembly 140 has a direct impact on measurement of fluid analysis and therefore the probe head assembly 170 should be in very close proximity of the flow cell assembly as seen best in FIG. 17.

Figure 4:
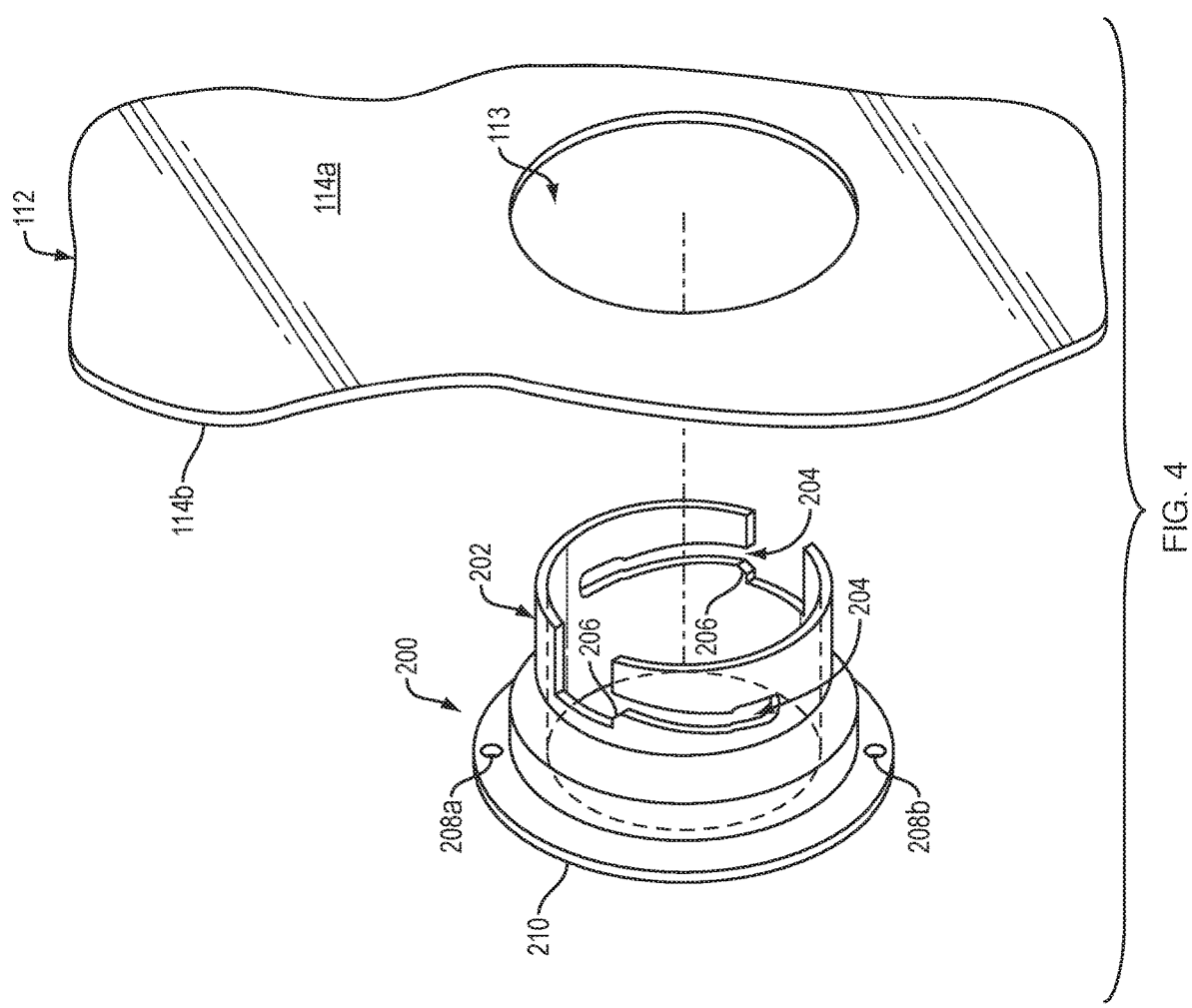
FIG. 4 is a portion of the partition wall in spaced relationship with a flange chamber of FIG. 3 in accordance with one embodiment of the technology described herein.
Figure 5:
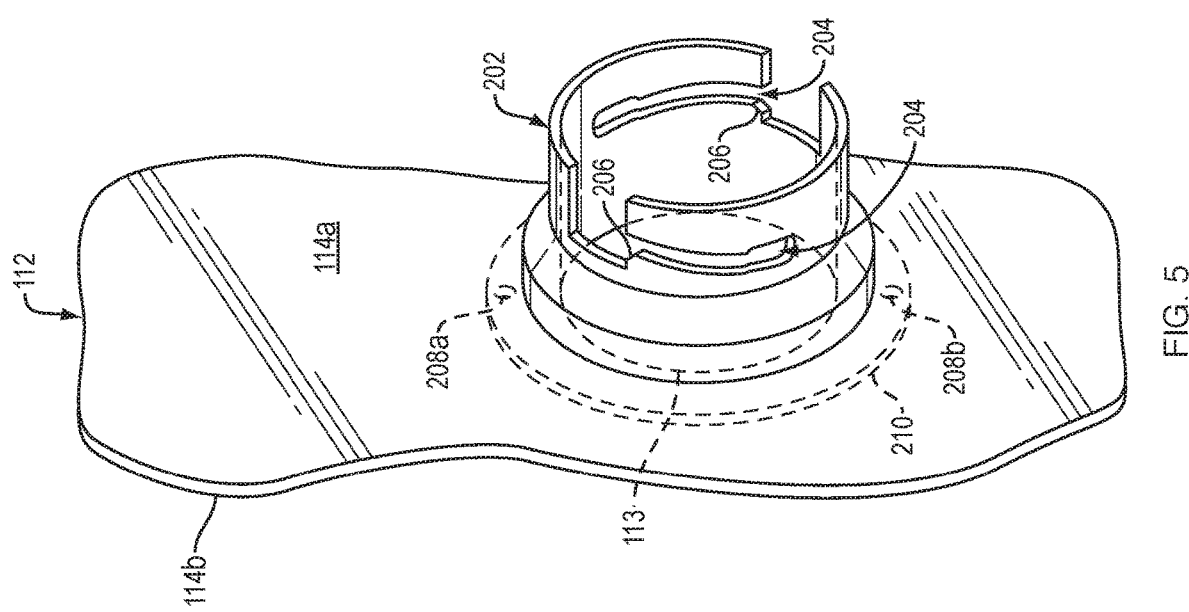
FIG. 5 is the same as FIG. 4 illustrating the flange chamber being attached to the partition wall.

FIG. 4 is a portion of the partition wall 112 in FIG. 3 in spaced relationship with a flange chamber 200 and FIG. 5 is the same as FIG. 4 illustrating the flange chamber being attached to the partition wall. The flange chamber 200 is mounted on the partition wall 112 via an opening 113 formed therethrough to securely contain the respective flow cell assembly 140 and the probe head assembly 170 on the respective opposed first and second surfaces 114a, 114b. The size and shape of the opening 113 correspond to the size and shape of the flange chamber 200 that being inserted therethrough. The flange chamber 200 includes a locking assembly 202 constructed thereto so as to engage with the flow cell assembly 200 during respective mounting and demounting of the flow cell assembly 140. The locking assembly 202 includes a pair of engagement notches 204 each of which having a flange notch 206 which are used to securely hold in place the spring arm 156 of the handle 144 so as to enable the flow cell assembly 140 to be mount onto to the flange chamber 200 without using any tools as will be discussed in greater detail hereinafter. The pair of the engagement notches 204 are mirror images of one another and are formed on opposed side of the locking assembly 202. The flange chamber 200 further includes a pair of dowel pin holes 208a, 208b each of which is formed across from one another. The pair of dowel pin holes 208a, 208b are used to receive respective dowel pins 209a, 209b (shown in FIG. 10) that are utilized to precisely position in the probe head assembly 170 with respect to the flow cell assembly 140 and hold the weight of the probe head assembly as well. After the flange chamber 200 is inserted through the opening 113, the flange 210 is abutted against second surface 114b and welded thereto. The flange chamber is welded to the partition wall 12 by a continuous weld around the entire hole 113 so that the weld seals off the joint and prevents leaking fluid from passing through the partition wall 112. The locking assembly 202 of flange chamber 200 can also be welded to the first surface 114a as seen best in FIG. 5.

Figure 6:
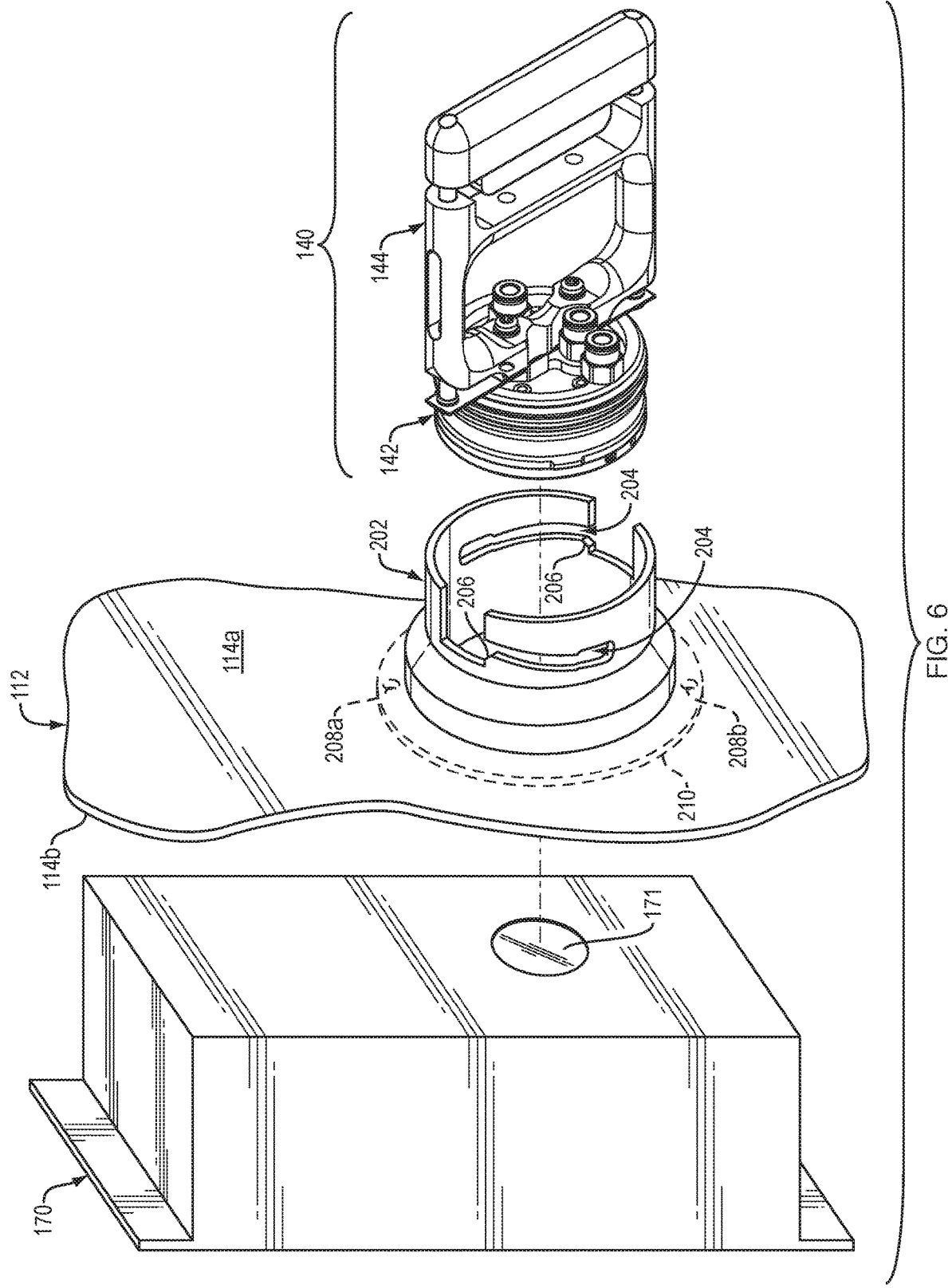
FIG. 6 is a portion of FIG. 2 illustrating the flow cell assembly and the probe head assembly in spaced relationship with respect to the partition wall in accordance with one embodiment of the technology disclosed herein.
Figure 7:
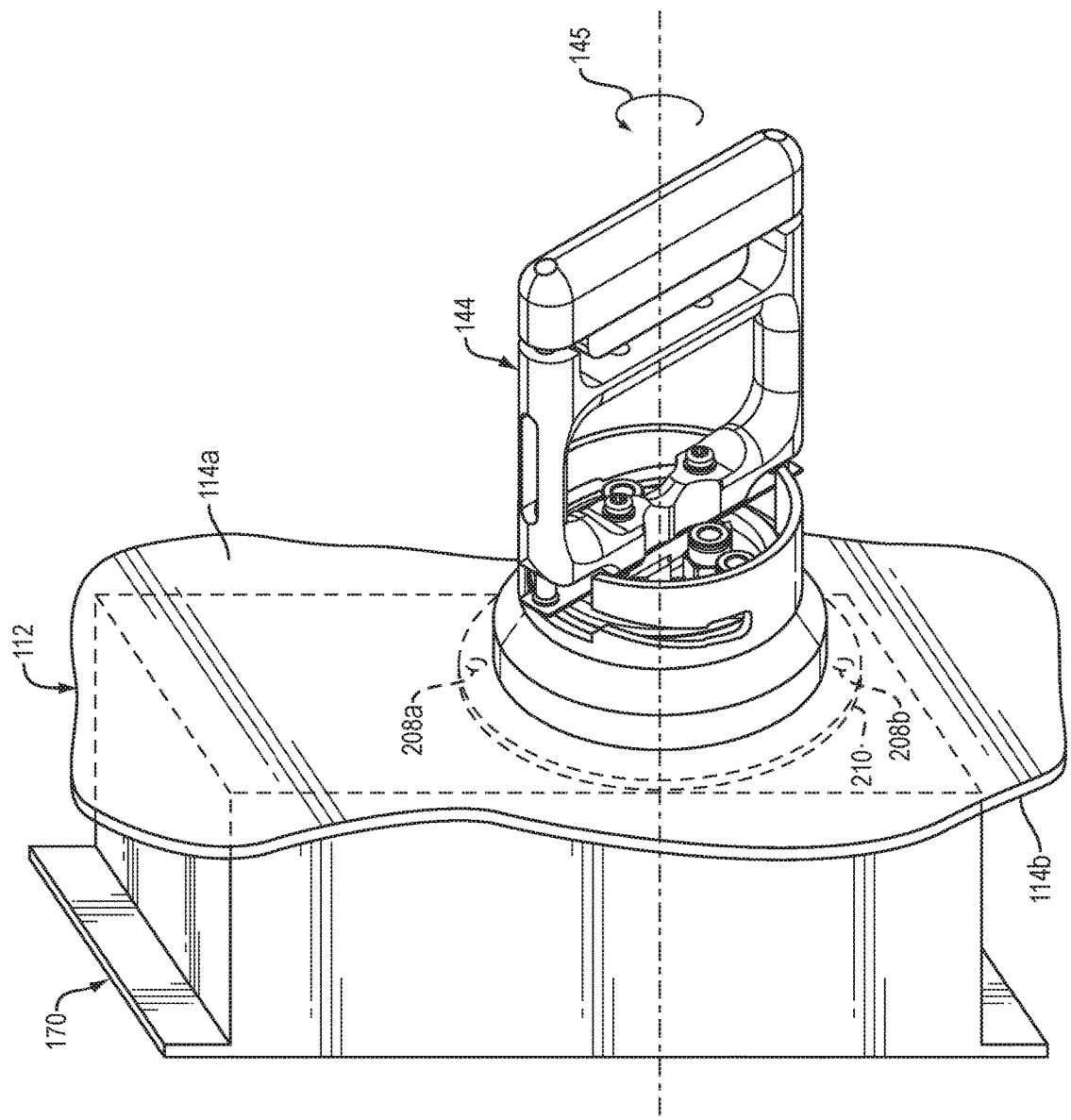
FIG. 7 is the same as FIG. 6 illustrating the flow cell assembly in a position to be mounted on the partition wall by rotating the flow cell handle by a rotation angle in a first rotation direction.
Figure 8:
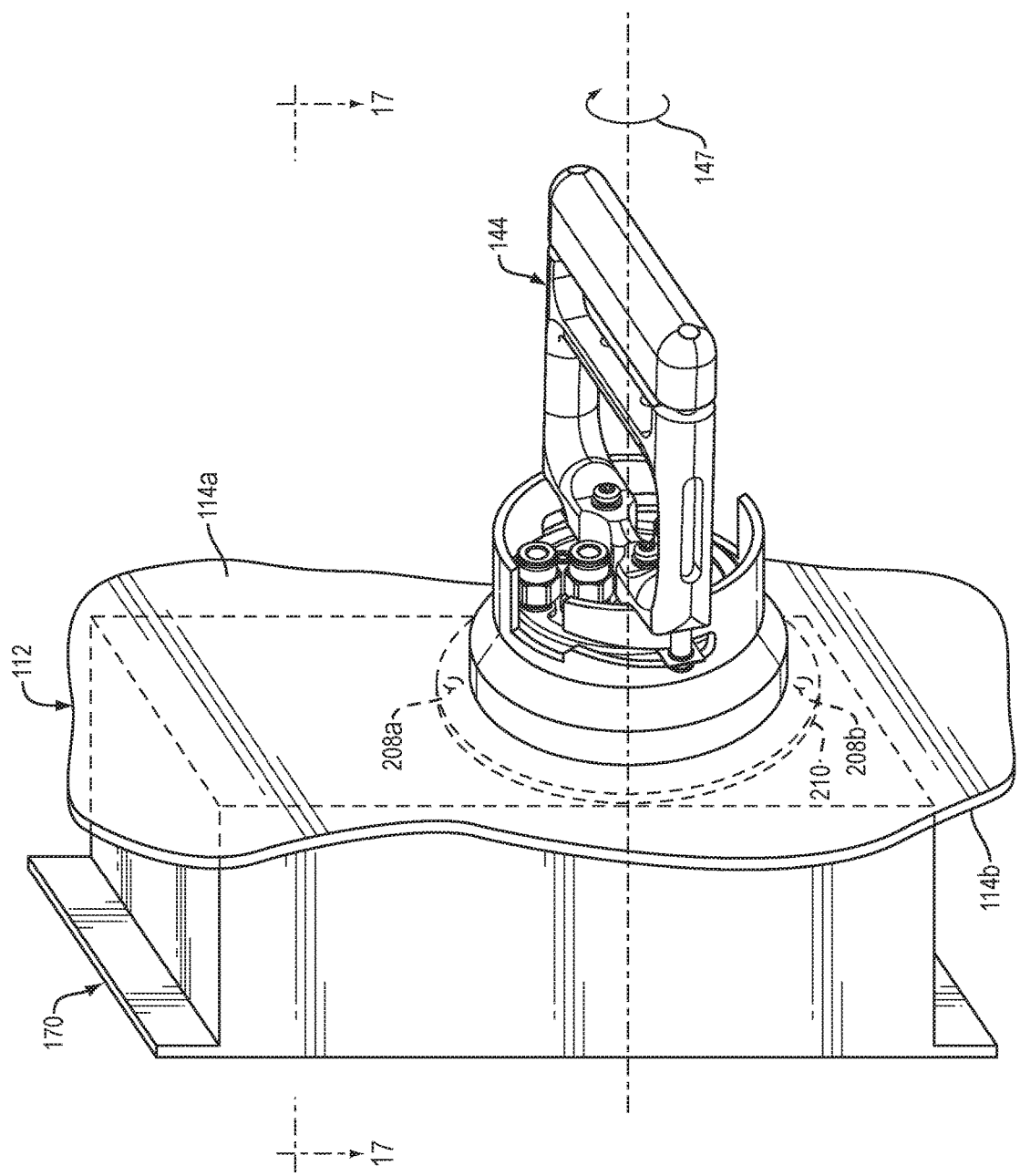
FIG. 8 is the same as FIG. 7 illustrating the flow cell assembly to be demounted from the partition wall by rotating the flow cell handle in a second rotation direction opposite to the first rotation direction.

FIG. 6 is a portion of FIG. 2 illustrating the probe head assembly 170 having an aperture 171 and the flow cell assembly 140 in spaced relationship with respect to the partition wall 112 and FIGS. 7 and 8 illustrates the manner in which the flow cell assembly 140 is mounted or demounted from the partition wall 112. The flow cell assembly 140 is mounted on the first surface 114a of the partition wall 112 by rotating the flow cell handle 144 by a rotation angle in a first rotation direction 145 as seen best in FIG. 7. Contrariwise, the flow cell assembly 144 is demounted from the first surface 114a of the partition wall 112 by rotating the flow cell handle 144 in a second rotation direction 147 opposite to the first rotation direction 145 as seen best in FIG. 8. It should be noted that the rotation angle is limited by the engagement notch 204a and the rotation angle is approximately between 45 degrees and 90 degrees.

Figure 9:
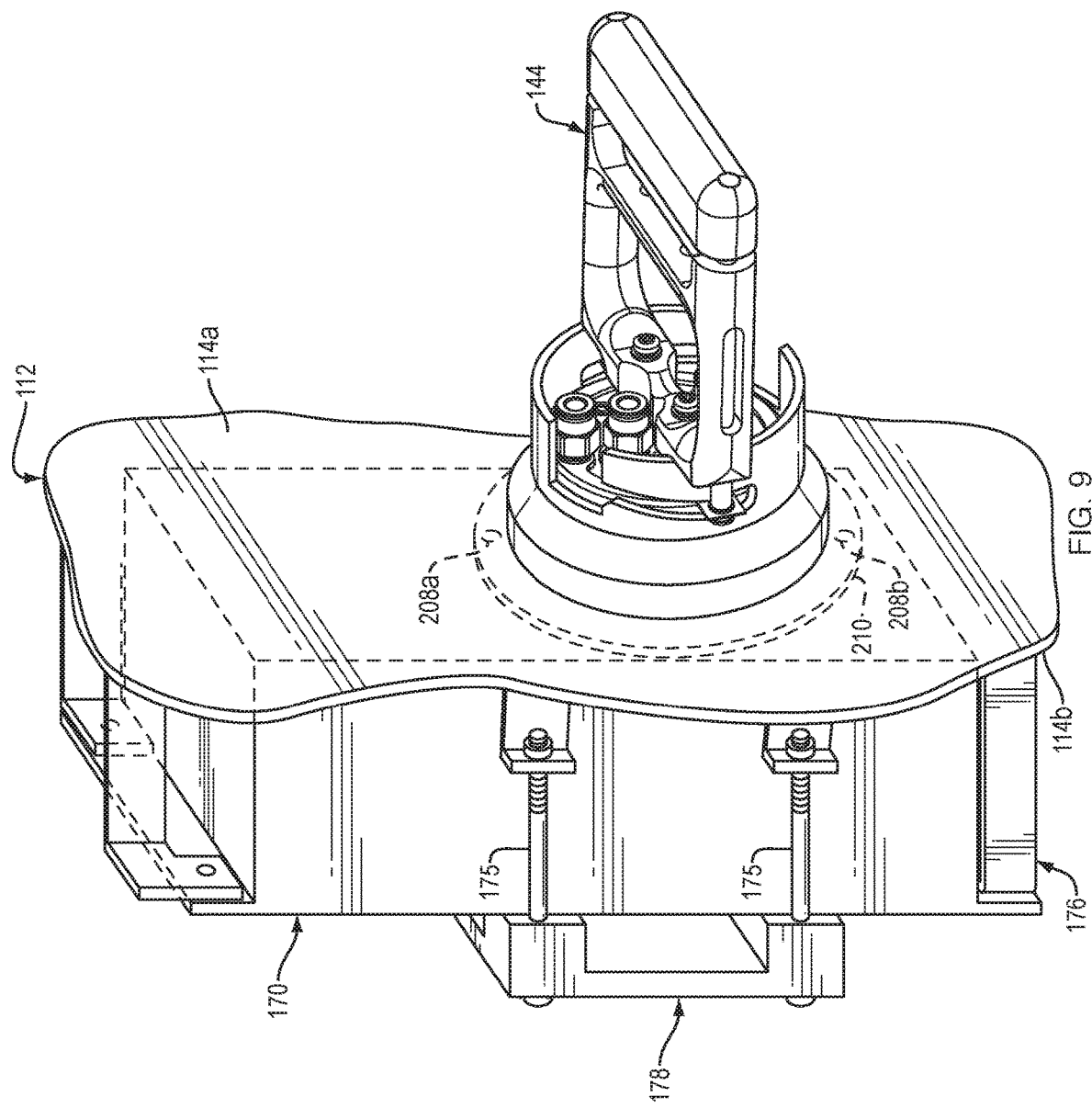
FIG. 9 is a perspective view of both the flow cell assembly and the probe head assembly illustrating opposed dowel pin holes on the flange chamber used to strategically mounting of the probe head assembly with respect to the flow cell assembly.
Figure 10:
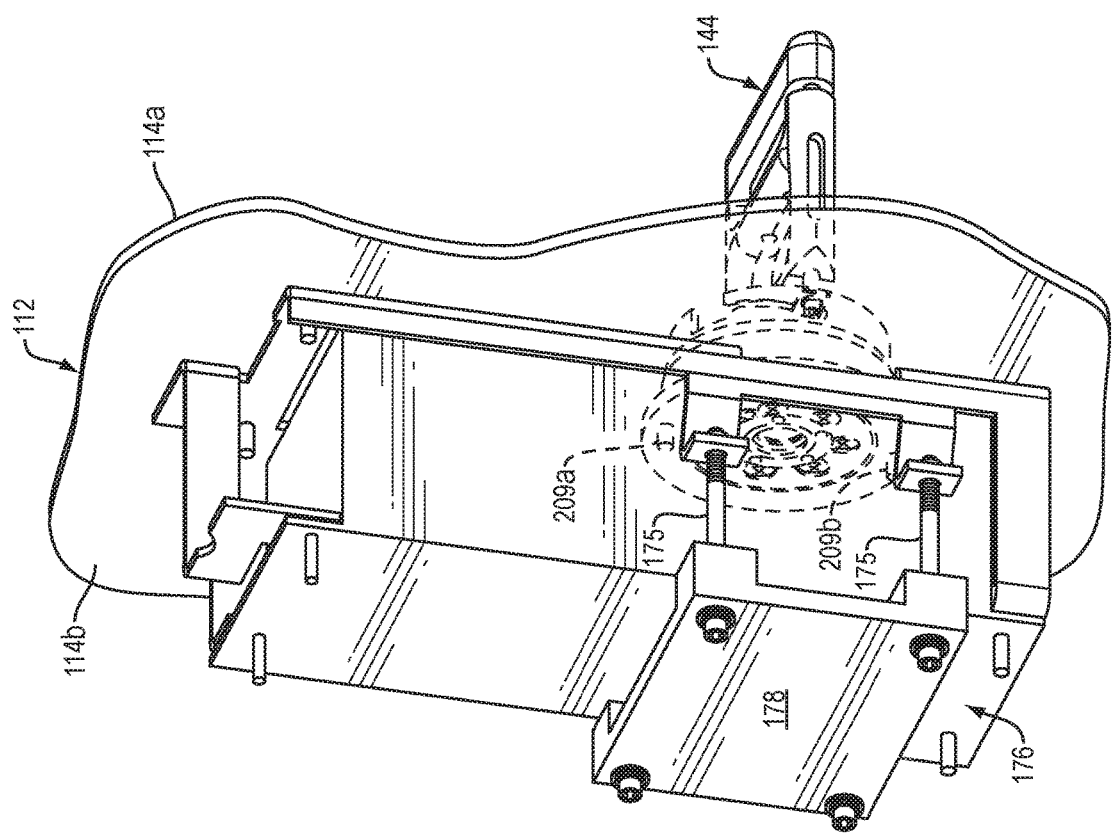
FIG. 10 is a the same as FIG. 9 illustrating the probe head assembly that is supported by a cradle and a clamp plate.

FIG. 9 is a perspective view of both the flow cell assembly 140 and the probe head assembly 170 illustrating opposed dowel pin holes 208a, 208b on the flange chamber 200 used to strategically mount the probe head assembly 170 with respect to the flow cell assembly 140 and FIG. 10 is a the same as FIG. 9 illustrating the probe head assembly 170 is supported by a cradle 176 and a clamp plate 178. It should be noted that the probe head assembly 170 comprises an X-ray generator 172 and an X-ray detector 174 that are concealed thereof as seen best in FIG. 17. Since the X-ray generator 172 and an X-ray detector 174 are at a tilted position with respect to the aperture 171, therefore, it is paramount that the probe head assembly 170 be placed in correct position by using the dowel pins 209a, 209b. The probe head assembly 170 sits on a cradle 176 and is held in place against the flanged 210 by using the clamp plate 178 and four cap screws 175.

Figure 11:
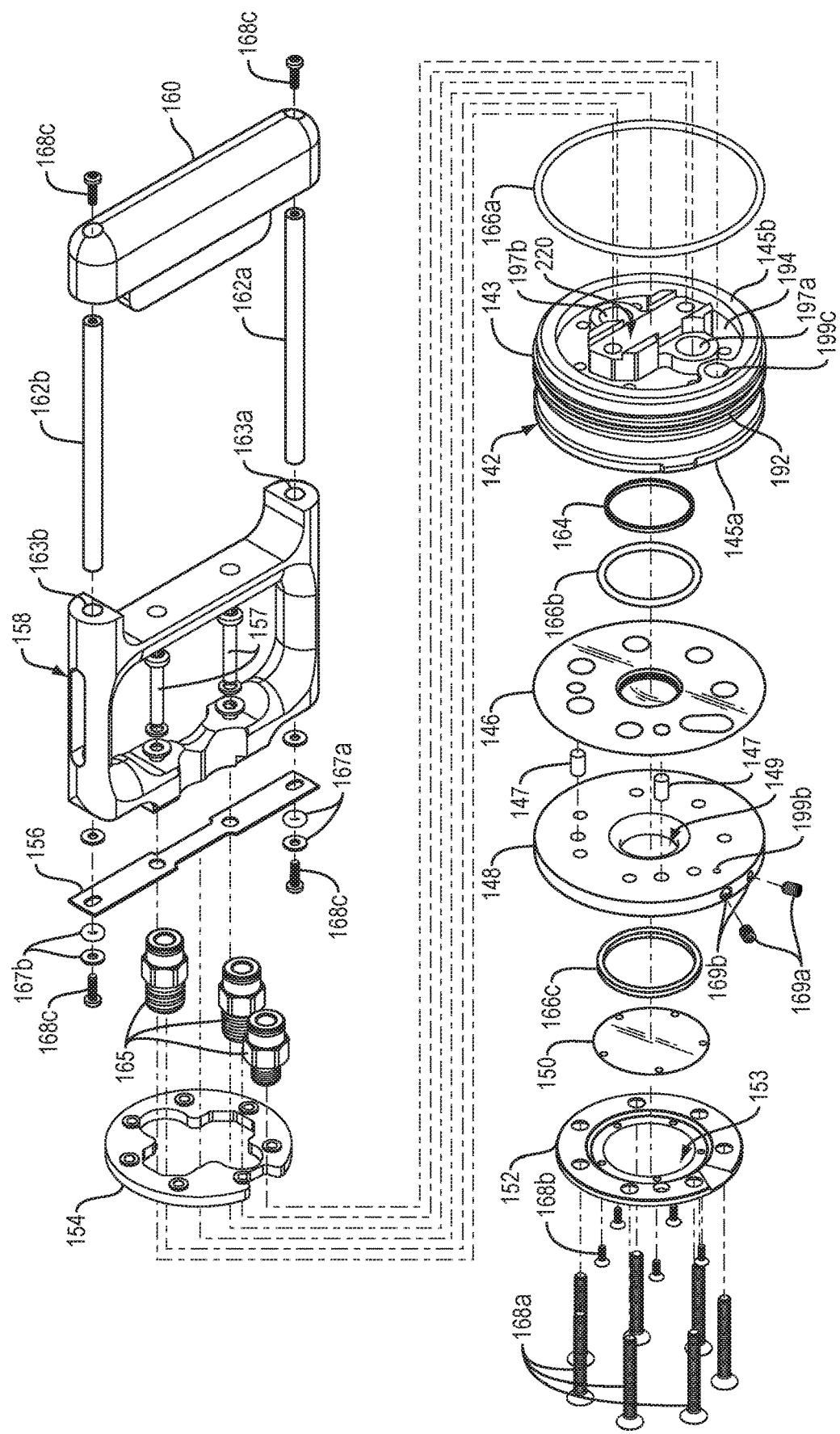
FIG. 11 is an exploded perspective view of the flow cell assembly showing in FIGS. 6-9 illustrating various components of the flow cell assembly in spaced relationship with one another.
Figure 12:
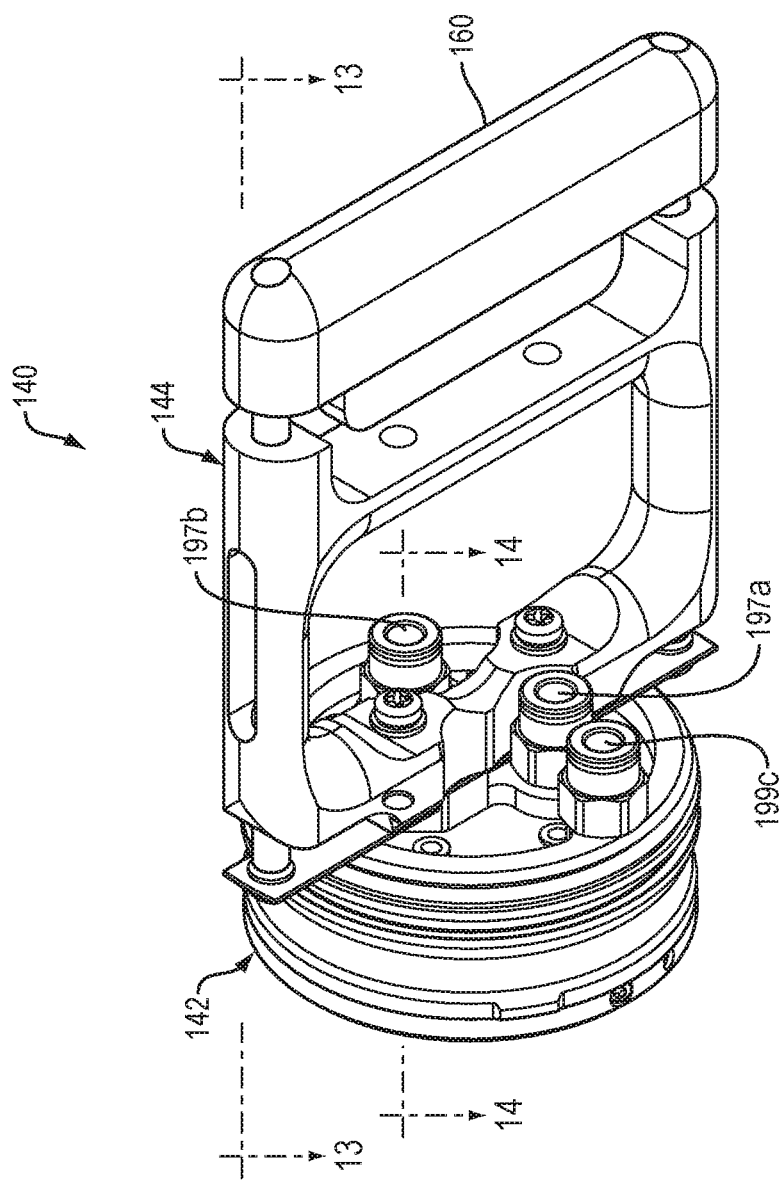
FIG. 12 is a perspective view of the flow cell assembly shown in FIG. 11 in an assembled relationship.

FIG. 11 is an exploded perspective view of the flow cell assembly 140 showing in FIGS. 6-9 illustrating various components of the flow cell assembly 140 in spaced relationship with one another and FIG. 12 illustrates the flow cell assembly 140 in an assembled position. The flow cell assembly 140 comprises a flow cell chamber 142, a primary window 146, a cover flow cell seal 148, a secondary window 150, a window plate 152, a plurality of O-rings 166a, 166b, 166c, a backing ring 164, a backing plate 154, a spring arm 156, a handle 158, and a handle grip 160 all of which are interconnected to one another via various screws 168a, pins 147, and fittings 165. The flow cell chamber 142 is defined by a generally cylindrical body 143 having respective first and second ends 145a, 145b spaced apart from one another. The cylindrical body 143 includes at least one groove 192 formed therein to receive the O-ring 166a. The O-ring 166a protects the electric compartment 104b against any liquid leak in the fluid compartment 102a at the various fittings, valves, and tubes. The first end 145a include a fluid chamber 190 formed therein and the second end 145b includes a recess tray 194 formed therein. The fluid chamber 190 and the recess tray 194 are configured to be in fluid communication via a plurality of flow paths 196a, 196b, 199c that extend from the first end 145a to the second end 145b within the body 143. Each of the plurality of flow paths is defined as an inlet flow path 196a, an outlet flow path 196b, and a drain flow path 198 as seen best in FIGS. 14 and 15. The respective inlet flow path 196a and the outlet flow path 196b includes respective inlet fluid port 197a and outlet fluid port 197b each of which passing fluid such as liquid into and out of the fluid chamber 190, respectively. The recess tray 194 includes a channel 220, respective inlet and outlet fluid ports 197a, 197b and a drain port 199c all of which are formed with in the recess tray 194. The respective inlet and outlet fluid ports 197a, 197b and a drain port 199c receive respective quick-connect fittings 165 as seen best in FIG. 12. The quick-connect fittings 165 is used to facilitate connection to the liquid circuit line depicted in FIG. 2. A backing plate 154 is configured to be disposed in the recess tray 194 and is in register within the recess tray 194 and is used in tandem with the window plate 152 to interconnect all of the components of the flow cell therebetween. A backing ring 164 and an O-ring 166b are disposed on the first end 145a of the body 143 so as to ensure proper sealing and attachment among interconnected components. The flow cell assembly 140 may be made of any machinable material, preferably a plastic material such as Polytetrafluoroethylene (PTFE), Perfluoroalkoxy (PFA) or Polyvinylidene fluoride (PVDF). The fluid chamber 190 and the recess tray 194 and the plurality of flow paths 196a, 196b, 198d are all machined within the body 143.

Continue referring to FIG. 11, the X-ray primary window 146 is configured to be attached to the first end 145a of the body 143 for encapsulating the liquid in the fluid chamber 190 and allowing an X-ray source to analyze the liquid in a static mode or in flow mode through the flow cell assembly 140. Holes on the X-ray primary window 146 are used for various dowels pin 147 fit therethrough. The central portion of the X-ray primary window 146 is protruded due to the internal pressure of the liquid in the chamber 190. As a non-limiting example, in one embodiment, the liquid pressure is approximately 3 psi. The X-ray primary window 146 is made of a film of fluorinated ethylene propylene (FEP Teflon). As a non-limiting example, in one embodiment, the thickness of the FEP Teflon film is 12 µm. However, other film thicknesses ranging from a minimum of about 4 µm up to a maximum of about 20 µm may be used, and all such film thicknesses are within the scope of the present disclosure. It should be noted that FEP Teflon is a material which has high corrosion resistance, high melting point (260° C.), good mechanical strength and flexibility, and low coefficient of friction. It should be also noted that the X-ray primary window made of FEP Teflon has been found to be more resistant to accumulation of sediments on the window surface than when using windows of other materials such as Kapton. In an alternative embodiment, the X-ray primary window 146 may be made of polypropylene or a film of diamond formed by chemical vapor deposition (CVD) or other methods. Moreover, it should be noted that other composite and/or non-composite embodiments of the X-ray primary window 146 are possible and all are within the scope of the present disclosure.

Figure 14:
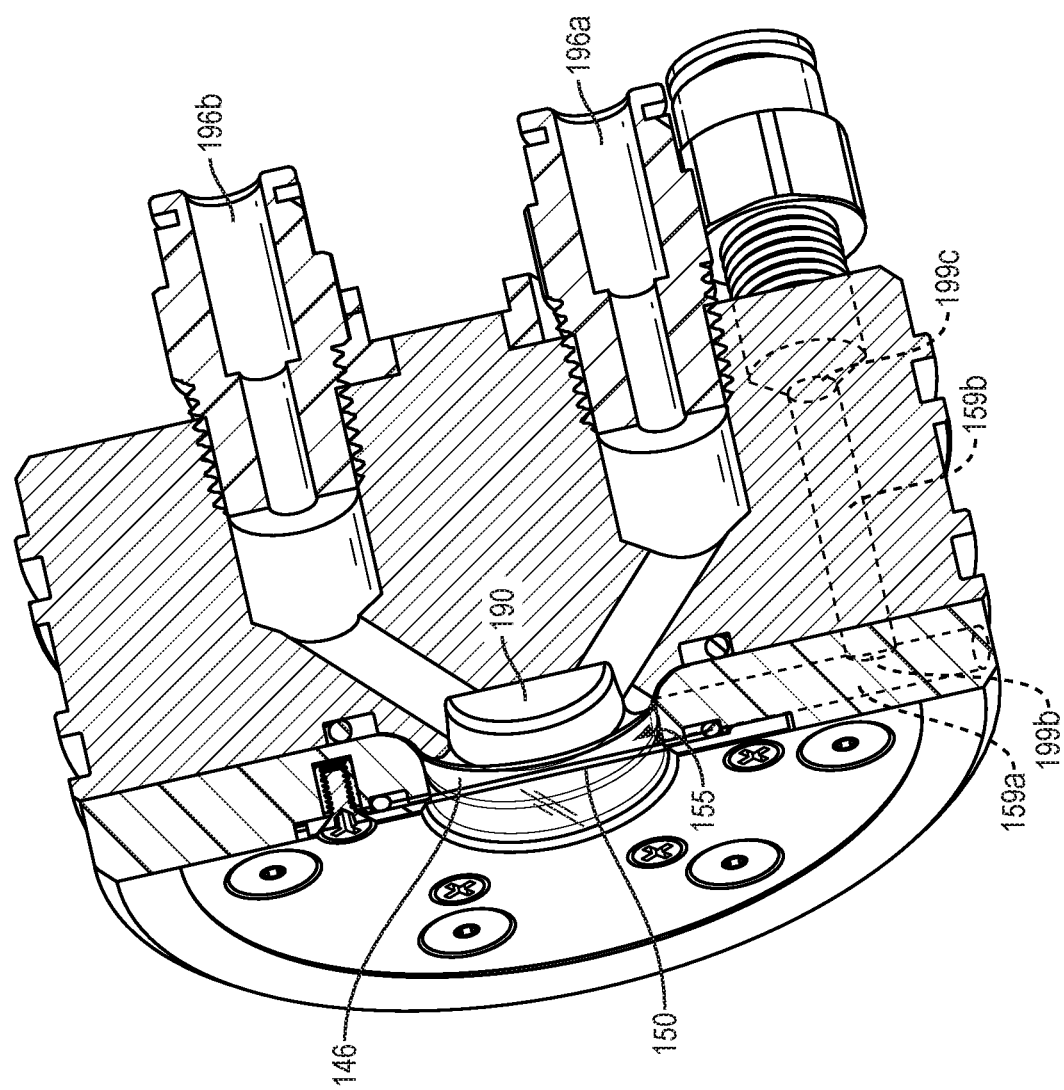
FIG. 14 is a cross-sectional view of the flow cell assembly taken along line 14-14 with some components being removed to more clearly illustrate the manner in which the flow chamber receives fluid from respective inlet and out ports.
Figure 15:
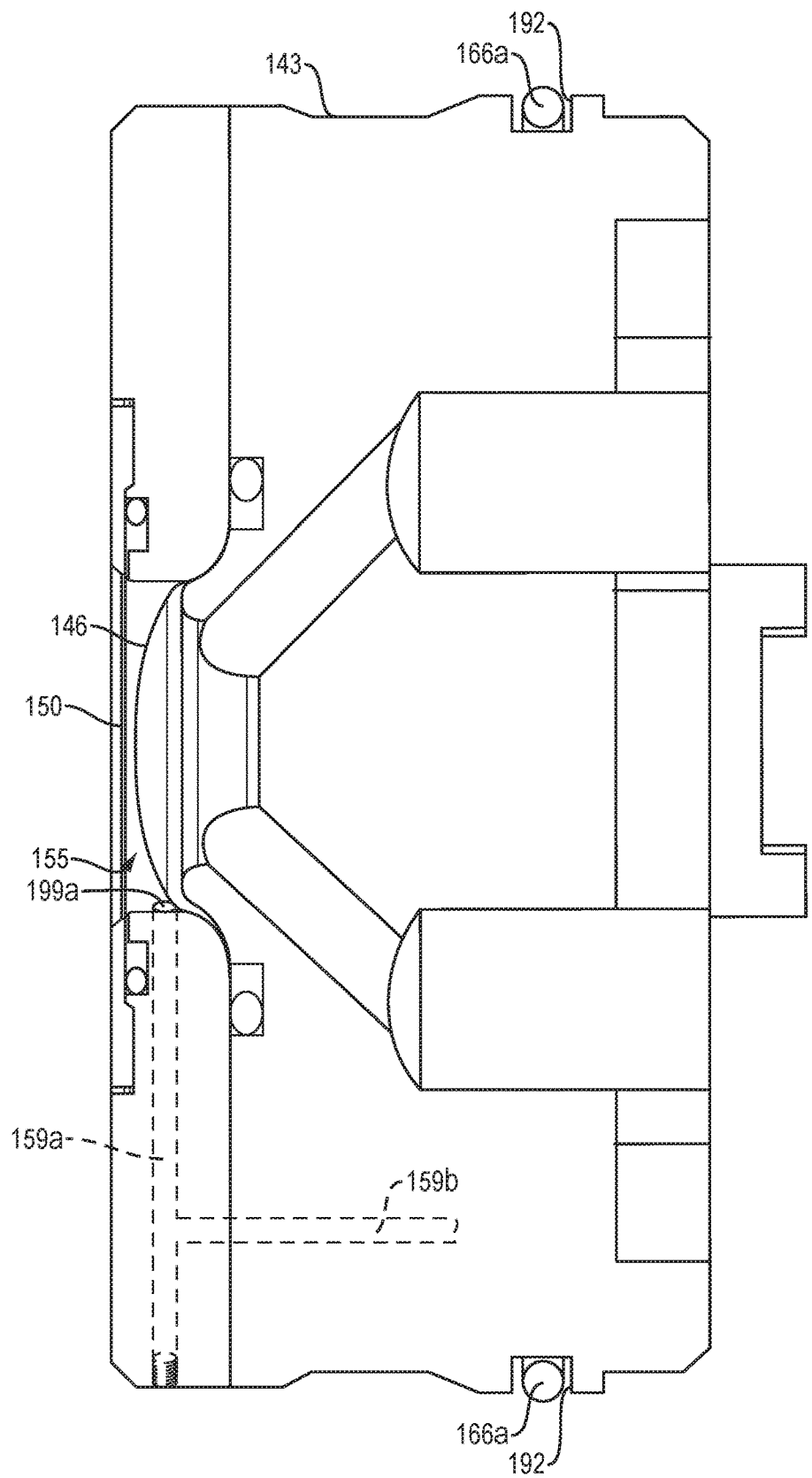
FIG. 15 is similar to FIG. 14 illustrating an air gap having a drain flow path formed by respective primary and secondary window.

A cover flow cell seal 148 includes a cover central opening 149 having a drain hole 199a formed therein and is configured to be attached to the first end 145a of the body 143 with the X-ray primary window 146 sandwiched therebetween. As best depicted in FIGS. 14 and 15, the drain flow pass 159a is constructed by forming two holes 169b so that the flow path 159a can be reached in from central opening 149 to the drain hole 169b. After the drain flow pass 159 is constructed, the two holes 169b are plugged with the plugs 169a so that fluid is directed out of the flow cell assembly 140 via drain hole 199c. A window plate 152 include a plate central opening 153 formed therein and is configured to be attached to both of the X-ray secondary window 150 and the cover flow cell seal 148.

Still referring to FIG. 11, the X-ray secondary window 150 is configured to be attached to the window plate 152 enclosing the plate central opening 153 and thereby forming an air gap 155 between the X-ray secondary window 150 and the X-ray primary window 146 with the drain hole 199a located therebetween. The X-ray secondary window 150 provides a safety back up to avoid fluid damage to various components in the event of a rupture or leak in the X-ray primary window 146. The window plate 152 is configured to securely interconnect the body 143, the X-ray primary window 146, the x-ray secondary window 150, and the cover flow cell seal 148 to one another via various fasteners such as screw, pin and/or bolts 168a, 168b. It should be noted that the X-ray secondary window 150 is not normally in contact with liquid in the fluid chamber 190, and does not have to support the internal pressure of the liquid. In an embodiment, X-ray secondary window 150 is made of 4 µm thick Prolene film. A leakage tube may protrude into air gap 155 and directs any liquid leaking from X-ray primary window 146 into a leakage tray 138 as depicted in FIG. 2. To assemble the X-ray primary window 146 and the X-ray secondary window 150 onto the flow cell chamber, the backing ring 164 and the O-ring 166b are positioned onto the first end 145a of the flow cell chamber 142. Next, the X-ray primary window 146 is placed on the first end 145a and the cover flow cell seal 148 is attached to the first end 145a with the X-ray primary window 146 is sandwiched thereto and using the two pins 147 for correct positioning of the X-ray primary window 146 with respect to the chamber 190. Then, the O-ring 166c is positioned onto the cover flow cell seal 148 and the window plate 152 having the X-ray secondary window 150 attached thereto is attached to the respective the cover flow cell seal 148, the X-ray primary window 146, and the flow cell chamber 142 via fasteners 168a, 168b.

Figure 13:
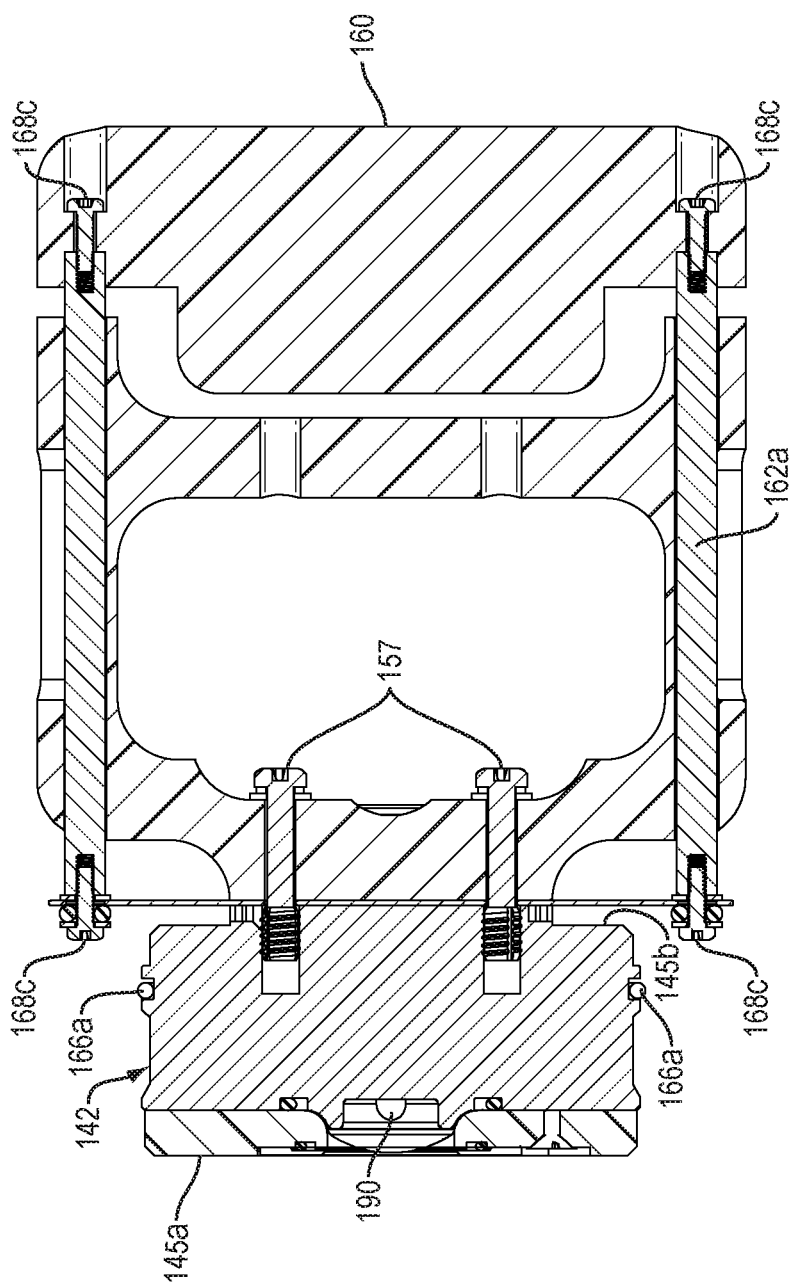
FIG. 13 is cross-sectional view of the flow cell assembly taken along line 13-13 with some components being removed to more clearly illustrate the manner in which the flow cell handle is attached to the flow cell body.

The flow cell handle 144 is defined by a handle 158, a handle grip 160, a pair of standoff rods 162a, 162b, and a spring arm 156 all of which are interconnected to one another via fasteners such as screws 168c. The flow cell handle 144 is mounted onto the second end 145b of the body 143. The handle grip is bolted to the pair of the standoff rods 162a, 162b via the screws 168c and the respective standoff rods 162a, 162b are inserted to respective holes 163a, 163b. The spring arm 156 is attached to the standoff rods 162a, 162b via various screws 168c, washers, and small O-rings 167a as best depicted in FIG. 13. Finally, the flow cell handle 144 is attached to the flow cell chamber 142 such that the mid portion of the spring arm 156 sits in the channel 220 on the second end 145b of the body 143 and is bolted thereto via two elongated bolts 157 as seen best in FIG. 12. To assemble the flow cell assembly 140 onto the locking assembly 202, a user holds the flow cell assembly 140 by gripping the flow cell handle 144, then the flow cell chamber 142 is inserted into the locking assembly 202 such that the spring arm 156 is aligned with the engagement notches 204 using the flange notch 206 and upon twisting the flow cell handle 144, the spring arm 156 is slightly over-pressured inside the engagement notches 204 and then relaxed when the flow cell assembly is properly positioned at the opening 113 on the partition wall 112. It should be noted that the spring arm 156 provides alignment of the flow cell chamber 142 inside the flange chamber 200 and also pushes back on the flange chamber 210 while pushing the flow cell chamber 142 up against the face of the probe head assembly 170. To dis-assemble or demount the flow cell assembly 140 from the locking assembly 202, the user slightly squeezes the handle grip so that the spring arms 156 is pushed a bit forward and be aligned with the engagement notches 20, to thereby remove the flow cell assembly 140 from the locking assembly 202.

Figure 16:
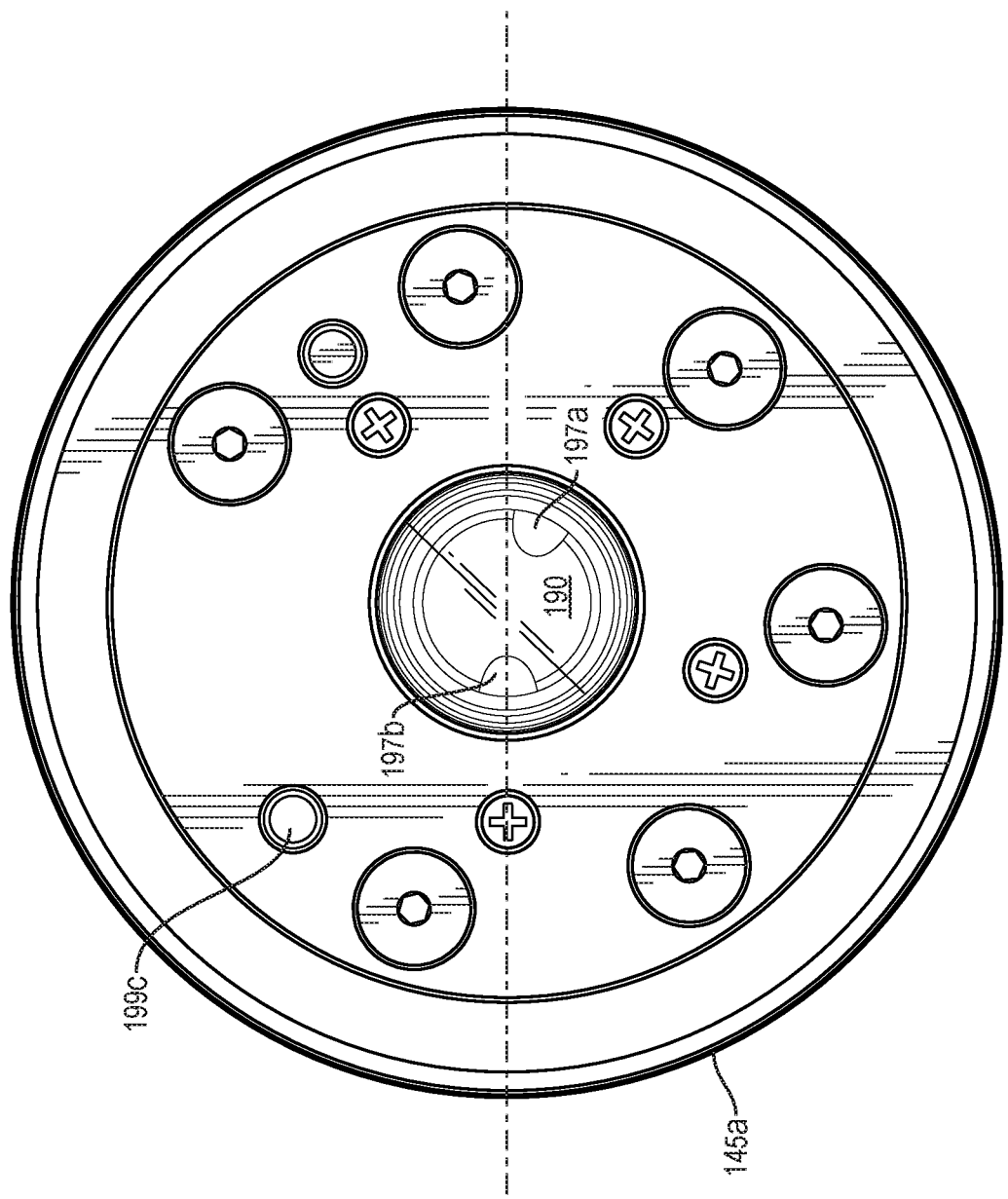
FIG. 16 is a top view of the flow chamber illustrating the position of an inlet port and an outlet port with respect to the diameter of the fluid chamber.

FIGS. 14-16 illustrate two cross sectional views of the flow cell assembly 140 and a top view of the flow chamber 142 illustrating the position of the inlet port 197a and the outlet port 197b with respect to the diameter of the fluid chamber 190 taken along line 14-14 with some components being removed to more clearly illustrate the manner in which the flow chamber 190 receives liquid from respective inlet and out ports 197a and 197b. It should be noted that the outlet port 197b is not located diametrically opposite inlet port 197a, so that liquid entering inlet port 197a is forced to swirl within the liquid chamber 190 in order to reach outlet port 197b. The fluid chamber 190 is shaped a substantially semi-circle so that the incoming liquid into chamber 190 would gain momentum due to the curvature wall of the chamber and, therefore, would sweep away any bubble or other impurity in the liquid to the outlet port 197b. This swirling motion assists in preventing accumulation of particulates on the interior surfaces of liquid chamber 190 and X-ray primary window 146. Moreover, in operation of flow cell assembly 140, inlet port 197a is located below outlet port 197b so that the action of gravity promotes further turbulence and stirring of the liquid, thereby preventing agglomeration of particulates.

Figure 17:
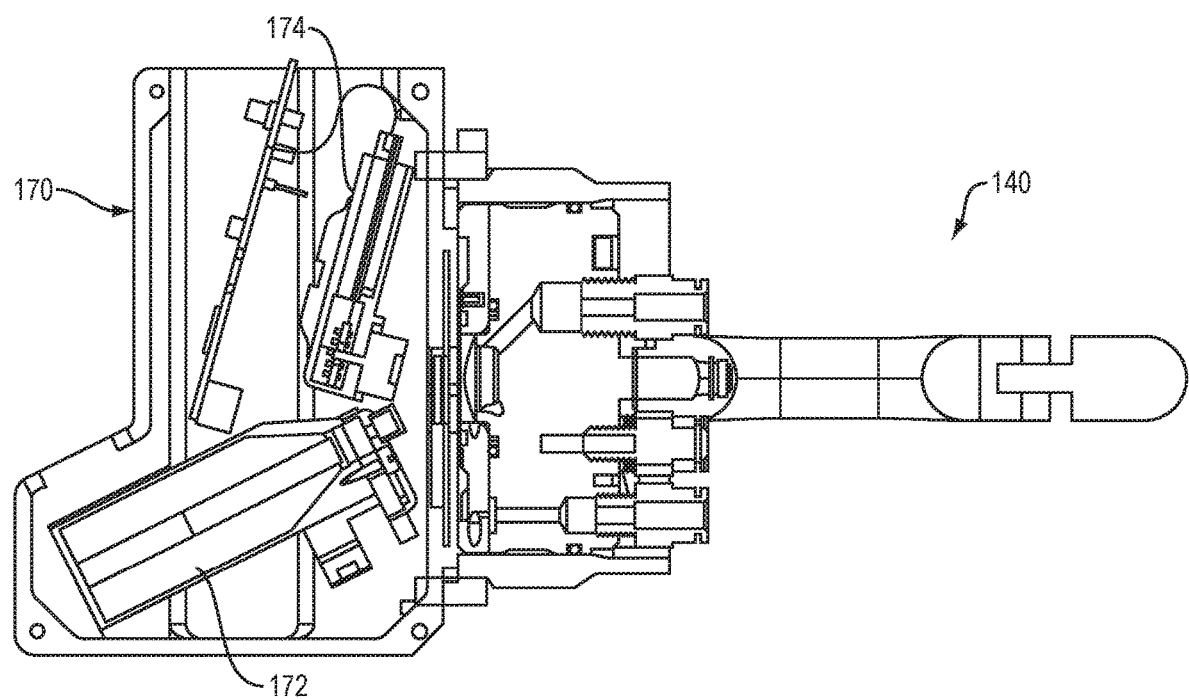
FIG. 17 is a cross-sectional view of both of the flow cell assembly and the probe head assembly taken along line 17-17, depicted in FIG. 8, with some components being removed to more clearly illustrate the manner an X-ray generator and X-ray detector are positioned to align and to communicate with the flow cell assembly.

FIG. 17 is a cross sectional view of both of the flow cell assembly 140 and the probe head assembly 170 taken along line 17-17 with some of components being removed to more clearly illustrate the manner an X-ray generator 172 and X-ray detector 174 are positions to communicate with the flow cell assembly 140. The respective primary and secondary X-ray windows are transparent which enables the fluid flowing through the chamber 190 to be irradiated with an X-ray source and the fluorescent X-ray radiation emitted by the irradiated fluid to be detected with an X-ray detector 174. The fluid is irradiated so as to release electrons from the innermost shells of atoms in the fluid. The resultant vacancies are then filled by electrons from the outer shells of the atoms. During these transitions, the fluorescent X-ray radiation is generated that is characteristic for each element. This fluorescent X-ray radiation, which is detected by the X-ray detector, thus provides information on the composition of the fluid, and therefore enables the detection, for example, of any unwanted elements in the fluid. To conduct accurate measurement, the aperture 172 of probe head assembly 170 is positioned not more than 1 mm from the face of the flow cell assembly 140.

To operate the system 100 in static measurement mode, the fluid chamber 190 is filled with liquid, then inlet fluid port 197a and outlet fluid port 197b are closed off either internally or externally to the fluid compartment 102a, and the pneumatic switching valve 117 is opened to allow atmospheric pressure at inlet liquid line. Therefore, in static measurement mode the liquid pressure within liquid chamber 190, and thus the pressure on the X-ray primary window 146, is determined by the height of atmospheric inlet liquid line above liquid chamber 190. Use of static measurement mode allows better repeatability of pressure, enabling better repeatability of the distance between the X-ray primary window 146 and the entrance window of the X-ray detector 174. In contrast, when the liquid system is operating in flow mode, the pressure within the fluid chamber 190 is determined by the variable pressure control of the incoming liquid.

In sum, the technology disclosed herein is directed to a system for analyzing a fluid which comprises an integrated fluid-electric cabinet having a fluid compartment and an electronic compartment. The fluid compartment and an electronic compartment are separated from one another by a partition wall. The partition wall includes opposed first and second surfaces. A flow cell assembly is disposed in the fluid compartment and is configured to be mounted on the first surface side of the partition wall. A probe head assembly is disposed in the electronic compartment and is mounted on the opposed second surface side of the partitioned wall. Both of the flow cell assembly and the probe head assembly are configured to be in electro-magnetic communication with one another for elemental analysis of the fluid such that the probe head assembly utilizes an X-ray source to analyze the fluid in a static state or in flow mode through the flow cell assembly. The system further comprises a control circuit disposed in a control circuit cabinet and is coupled to both of the flow cell assembly and the probe head assembly to control a continuous operation of the fluid cell assembly and the probe head assembly.

The system includes a flange chamber mounted on the partition wall via an opening formed therethrough to securely contain the respective flow cell assembly and the probe head assembly on the respective opposed first and second surfaces of the partition wall. The flange chamber includes a locking assembly constructed thereto so as to engage with the flow cell assembly during respective mounting and demounting of the flow cell assembly. The flow cell assembly comprises a flow cell chamber, a primary window, a cover flow cell seal, a secondary window, a window plate, a plurality of O-rings, a backing ring, a backing plate, a spring arm, a handle, and a handle grip all which are interconnected to one another via various screws, pins, and fittings. The locking assembly includes a pair of engagement notches each of which having a flange notch which are used to securely hold the spring arm of the handle so as to enable the flow cell assembly to be mounted onto to the flange chamber without using any tool. The primary window includes respective primary inner and outer surfaces.

The primary inner surface is contacting the fluid contained in the flow cell chamber and the primary outer surface is facing the X-ray source for irradiating the fluid and detecting radiation emitted by the fluid so as to analyze the fluid. The respective primary and secondary windows are configured to be spaced apart from one another so as to form an air gap therebetween. The secondary window provides a safety back up to avoid liquid damage to various components in the event of a rupture or leak in the primary window.

The fluid compartment further comprises a leakage tube having a first end located at a lower end of the air gap such that a fluid leakage portion of the fluid leaking into the air gap enters the first end of the leakage tube and exits a second end of the leakage tube. The fluid leakage portion that exit the second of the leakage tube is directed to a leakage tray and is drained by a leak drainage tube. The leakage tube is equipped with a first leak sensor configured to detect fluid within the leakage tube. The leak drainage tube is equipped with a second leak sensor configured to detect fluid within the leak drainage tube.

The flow cell chamber is defined by a fluid chamber having respective inlet and outlet ports for passing the fluid in and out from the fluid chamber. The respective inlet and outlet ports are constructed such that the inlet port position is at lower gravitational position with respect to the outlet port position so that the fluid entering the inlet port is forced to swirl within the fluid chamber in order to reach to the outlet port, thereby preventing accumulation of fluid particulates or air bubbles on the primary inner surface of the primary window. The flow cell assembly is mounted on the first surface side of the partition wall by rotating the flow cell handle by a rotation angle in a first rotation direction. The flow cell assembly is demounted from the first surface of the partition wall by rotating the flow cell handle in a second rotation direction opposite to the first rotation direction. The rotation angle is limited by the engagement notch and the rotation angle is approximately between 45 degrees and 90 degrees.

The probe head assembly comprises an X-ray generator and an X-ray detector wherein the X-ray generator is configured to direct X-rays penetrating the primary window and entering the fluid and the X-ray detector is configured to detect the characteristic X-rays emitted from the fluid. The electro-magnetic communication between the flow cell assembly and the probe head assembly is defined by irradiating the fluid in the flow cell assembly using an X-ray generator and detecting characteristic X-rays emitted from the fluid using an X-ray detector.

The flow cell assembly comprises a flow cell chamber, a primary window, a cover flow cell seal, a secondary window, a window plate, a plurality of O-rings, a backing ring, a backing plate, and a flow cell handle all of which are interconnected to one another via fasteners. The flow cell handle defined by a handle a handle grip, a pair of standoff rods and a spring arm all of which are interconnected to one another via fasteners. The flow cell assembly is configured to be mounted or demounted, respectively, onto or from the flange chamber without using any tools.

A flow cell assembly comprises a body having respective first and second ends spaced apart from one another. The first end include a fluid chamber formed therein and the second end includes a recess tray formed therein. The fluid chamber and the recess tray are in fluid communication via a plurality of flow paths that extend from the first end to the second end within the body. An X-ray primary window is configured to be attached to the first end of the body for encapsulating the fluid in the chamber and allowing an X-ray source to analyze the fluid in a static state or in flow mode through the flow cell assembly. A cover flow cell seal having a cover central opening and a drain hole formed therein and is configured to be attached to the first end of the body with the X-ray primary window sandwiched therebetween. A window plate having a plate central opening formed therein and is configured to be attached to both of the X-ray primary window and cover flow cell seal. An X-ray secondary window is configured to be attached to the window plate enclosing the plate central opening, thereby forming an air gap with the drain hole located therebetween and wherein the secondary window provides a safety back up to avoid fluid damage to various components in the event of a rupture or leak in the X-ray primary window and wherein a window plate configured to securely interconnect the body, the X-ray primary window, the x-ray secondary window and the cover flow cell seal to one another via various fasteners. The flow cell assembly further comprises a flow cell handle defined by a handle, a handle grip, a pair of standoff rods, and a spring arm all of which are interconnected to one another via fasteners and wherein the flow cell handle being mounted onto the second end of the body. The recess tray includes a channel, respective inlet and outlet fluid ports, and a drain port all of which are formed with in the recess tray. A backing plate is configured to be disposed and is in register within the recess tray. The X-ray primary window and the x-ray secondary window are made from material comprised of fluorinated ethylene propylene (FEP Teflon).

a method of constructing a system for analyzing a fluid is disclosed. The method comprises the steps of fabricating an integrated fluid-electric cabinet having a fluid compartment and an electronic compartment each of which is separated from one another by a partition wall. The partition wall includes opposed first and second surfaces and an opening formed thereto. Next, forming a flange chamber having an integral locking assembly attached on the partition wall via the opening. The integral locking assembly includes an engagement notch and a flange notch. Next, mounting a flow cell assembly onto the flange chamber by rotating the flow cell assembly by a rotation angle in a first rotation direction and configured to be locked in by the engagement notch and a flange notch. And then, mounting a probe head assembly onto the electronic compartment by mounting on the opposed second surface of the partitioned wall. Finally, passing the fluid through the flow cell assembly, irradiating the fluid in the flow cell assembly using an X-ray generator, and detecting characteristic X-rays emitted from the fluid using an X-ray detector While various embodiments of the disclosed technology have been described above, it should be understood that they have been presented by way of example only, and not of limitation. Likewise, the various diagrams may depict an example construction or other configuration for the disclosed technology, which is done to aid in understanding the features and functionality that can be included in the disclosed technology. The disclosed technology is not restricted to the illustrated example construction or configurations, but the desired features can be implemented using a variety of alternative construction and configurations. Indeed, it will be apparent to one of skill in the art how alternative functional, logical or physical partitioning and configurations can be implemented to implement the desired features of the technology disclosed herein. Also, a multitude of different constituent parts names other than those depicted herein can be applied to the various parts. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

What is claimed is:

1. A system for analyzing a fluid, comprising;
    a movable flow cell assembly being disposed in an analysis location on a wall of an analysis instrument and being configured to be retained by a locking assembly on a first surface of the wall, and
    a probe head assembly located on an opposed second surface of the wall, the probe head assembly to direct an X-ray source to analyze the fluid in a static state in the movable flow cell assembly or in a flow mode through the movable flow cell assembly;
    wherein the movable flow cell assembly and the probe head assembly are in electro-magnetic communication for elemental analysis of the fluid using the X-ray source when the movable flow cell assembly is retained by the locking assembly on the first surface of the wall.

2. The system of claim 1, wherein the wall comprises a partition wall on or within the analysis instrument, the partition wall separating a fluid compartment from an electronics compartment.

3. The system of claim 1, comprising a control circuit to initiate a continuous-flow operation mode of the fluid cell assembly and the probe head assembly.

4. The system of claim 1, wherein the wall contains an opening formed therethrough; and wherein the movable flow cell assembly comprises a primary window aligned with the opening, the primary window including respective primary inner and outer surfaces;
  wherein the primary inner surface is contacting the fluid contained in a flow cell chamber of the movable flow cell assembly and the primary outer surface is facing the probe head assembly for receiving X-rays directed to the fluid and for transmitting radiation emitted by the fluid, in response, to support analysis of the fluid.

5. The system of claim 4, wherein the flow cell chamber comprises a fluid chamber having respective inlet and outlet ports for passing the fluid in and out from the fluid chamber.

6. The system of claim 5, wherein the respective inlet and outlet ports are arranged such that an inlet port position is at lower position with respect to an outlet port position to suppress or inhibit accumulation of fluid particulates or air bubbles on the primary inner surface of the primary window.

7. The system of claim 4, wherein the probe head assembly comprises an X-ray generator and an X-ray detector wherein the X-ray generator is configured to direct X-rays penetrating the primary window and entering the fluid and the X-ray detector is configured to detect the characteristic X-rays emitted from the fluid.

8. The system of claim 1, wherein the movable flow cell assembly is positioned into an analysis location on the wall by rotating the flow cell assembly in a first rotation direction to engage a retention feature in the locking assembly; and
  wherein the movable flow cell assembly is configured for removal from the analysis location, the removal by rotating the flow cell assembly in a second rotation direction opposite to the first rotation direction.

9. The system of claim 8, wherein the movable flow cell assembly comprises an arm to engage the retention feature; and
  wherein the movable flow cell assembly is configured for removal from the analysis location in part by disengaging the arm from the retention feature.

10. The system of claim 9, comprising a handle coupled to the arm to disengage the arm from the retention feature.

11. The system of claim 10, wherein the arm is retained in the engaged position at least in part using spring force; and
  wherein the handle is configured to be actuated against the spring force to disengage the arm from the retention feature.

12. A movable flow cell assembly for use in fluid analysis, the movable flow cell assembly comprising:
  a body having respective first and second ends, the first end comprising a fluid chamber formed therein and the second end includes a tray formed therein;
  wherein the fluid chamber and the tray are in fluid communication via at least one flow path that extends from the first end to the second end within the body;
  an X-ray primary window located at the first end of the body for encapsulating the fluid in the chamber and allowing an X-rays to penetrate the X-ray primary window to analyze the fluid within the movable flow cell assembly when the movable flow cell assembly is positioned into an analysis location on a wall of an analysis instrument, the fluid in a static state in the movable flow cell assembly or in a flow mode through the movable flow cell assembly.

13. The movable flow cell assembly of claim 12, wherein the movable flow cell assembly is configured for positioning into the analysis location on the wall by rotating the flow cell assembly in a first rotation direction to engage a retention feature in the locking assembly; and
  wherein the movable flow cell assembly is configured for removal from the analysis location, the removal by rotating the flow cell assembly in a second rotation direction opposite to the first rotation direction.

14. The movable flow cell assembly of claim 13, comprising an arm to engage the retention feature; and
  wherein the movable flow cell assembly is configured for removal from the analysis location in part by disengaging the arm from the retention feature.

15. The movable flow cell assembly of claim 14, comprising a handle coupled to the arm to disengage the arm from the retention feature.

16. The movable flow cell assembly of claim 15, wherein the arm is retained in the engaged position at least in part using spring force; and
  wherein the handle is configured to be actuated against the spring force to disengage the arm from the retention feature.

17. The movable flow cell assembly of claim 12, comprising an X-ray secondary window included as a portion of a plate cover seal located at the first end, the X-ray secondary window to inhibit or suppress fluid damage to X-ray source or detection circuitry in the event of a rupture or leak in the X-ray primary window.

18. The movable flow cell assembly of claim 12, wherein the tray comprises respective inlet and outlet fluid ports, and a drain port.

19. A method for analyzing a fluid, the method comprising:
  mounting a movable flow cell assembly in an analysis location on a wall of an analysis instrument by engaging a locking assembly on a first surface of the wall to retain the flow cell assembly, the analysis location providing a probe head assembly located on an opposed second surface of the wall, the probe head assembly to direct an X-ray source to analyze the fluid in a static state in the movable flow cell assembly or in a flow mode through the movable flow cell assembly;
  introducing the fluid into a fluid chamber of the movable flow cell assembly;
  irradiating the fluid in the movable flow cell assembly using the X-ray source of the probe head assembly, and
  detecting characteristic X-rays emitted from the fluid using an X-ray detector.

20. The method of claim 19, comprising removing the movable flow cell assembly from analysis location, the removal by rotating the flow cell assembly to disengage the movable flow cell assembly from the locking assembly.

* * * * *